US006060816A

United States Patent [19]
Audren

[11] Patent Number: 6,060,816
[45] Date of Patent: May 9, 2000

[54] VIBRATION MOTORS

[75] Inventor: Jean Thierry Audren, St Remy les Chevreuse, France

[73] Assignee: SFIM Industries, Massy, France

[21] Appl. No.: 09/145,242

[22] Filed: Sep. 2, 1998

[30] Foreign Application Priority Data

Sep. 3, 1997 [FR] France .................................. 97 10948

[51] Int. Cl.[7] .......................... H01L 41/02; H01L 41/053
[52] U.S. Cl. ................................ 310/323.02; 310/323.04; 310/328; 310/331
[58] Field of Search .................................. 310/328, 330, 310/331, 332, 323.02, 323.04

[56] References Cited

U.S. PATENT DOCUMENTS

| | | | |
|---|---|---|---|
| 4,714,855 | 12/1987 | Fujimoto | 310/328 |
| 4,937,488 | 6/1990 | Fujie et al. | 310/323.02 |
| 5,034,647 | 7/1991 | Ohtsuka | 310/328 |
| 5,068,566 | 11/1991 | Culp | 310/328 |
| 5,172,023 | 12/1992 | Kawai et al. | 310/323.02 |
| 5,532,540 | 7/1996 | Claeyssen et al. | 310/323.02 |

FOREIGN PATENT DOCUMENTS

| | | | |
|---|---|---|---|
| 2 721 675 | 12/1995 | France . | |
| 3118864 | 10/1982 | Germany | H01L 41/00 |
| 63-249480 | 10/1988 | Japan | H02N 2/00 |

OTHER PUBLICATIONS

Japanese Abstract 2111269, Tadakazu, "Multilayer Vibrating Motor", Apr. 24, 1990.

*Primary Examiner*—Nestor Ramirez
*Assistant Examiner*—Burton Mullins
*Attorney, Agent, or Firm*—Jacobson, Price, Holman & Stern, PLLC

[57] ABSTRACT

A vibration motor includes in a casing at least two pairs of stator plates which comprise tangential deformation active members and two rotor disks between the plates of respective pairs. Active members for generating a normal force extend between the facing plates of both pairs. A spring arrangement is disposed between the pairs of plates and the casing.

9 Claims, 3 Drawing Sheets

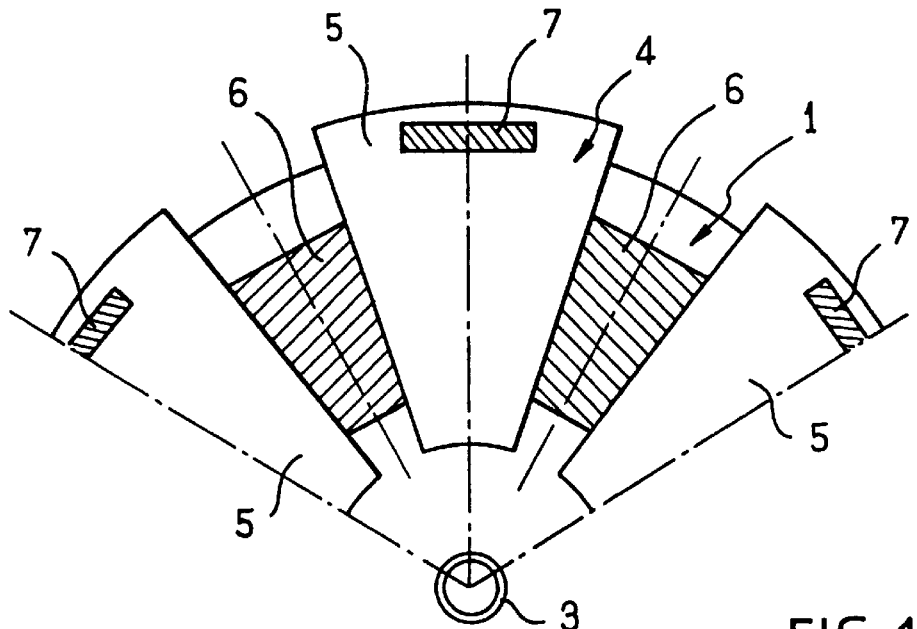
FIG_1
(PRIOR ART)
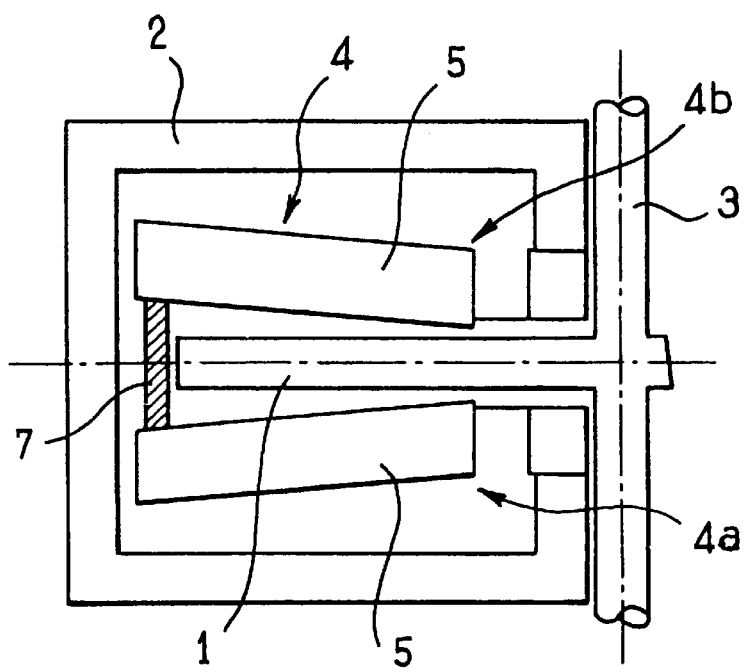
FIG_2
(PRIOR ART)

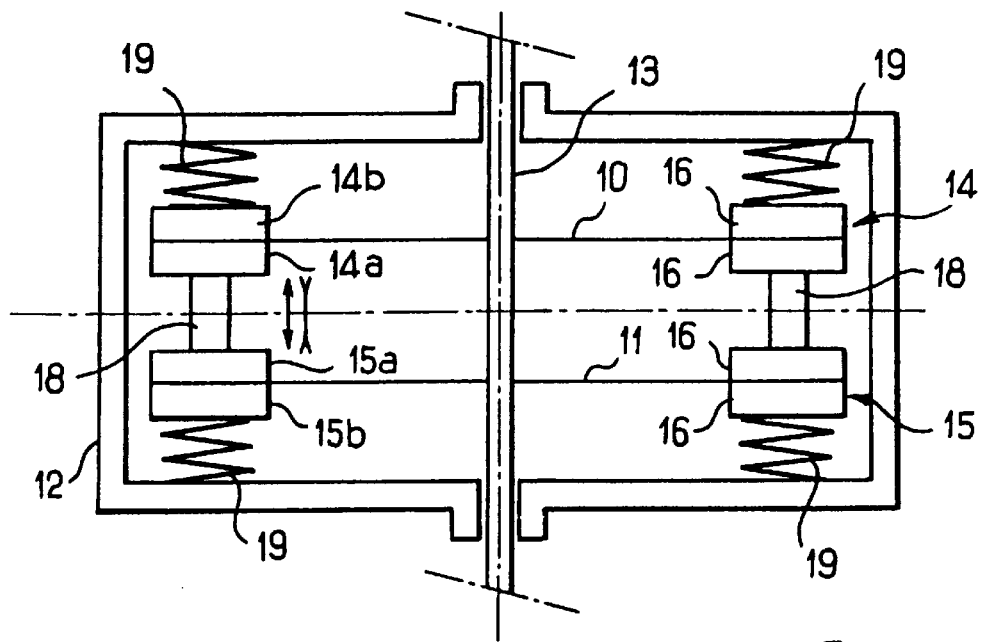
FIG_3
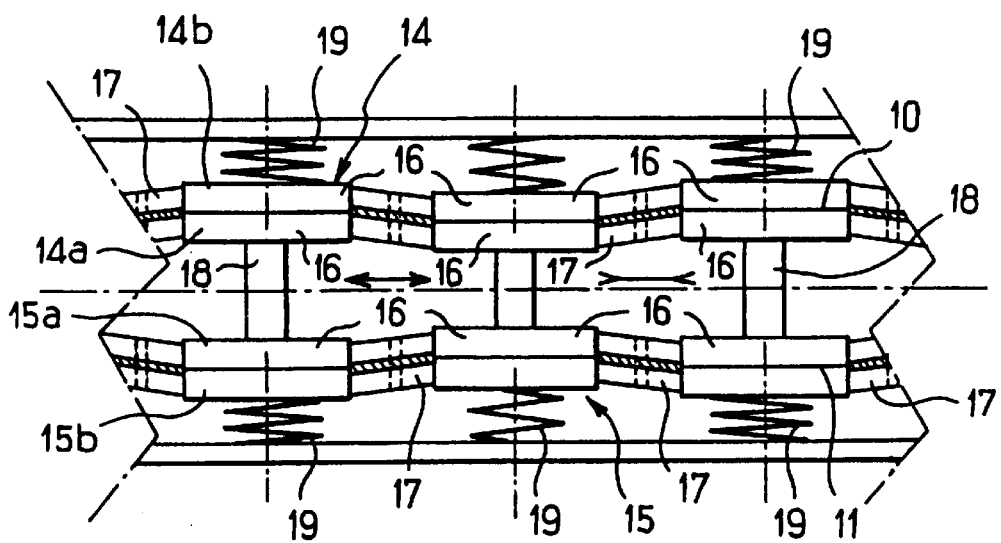
FIG_4

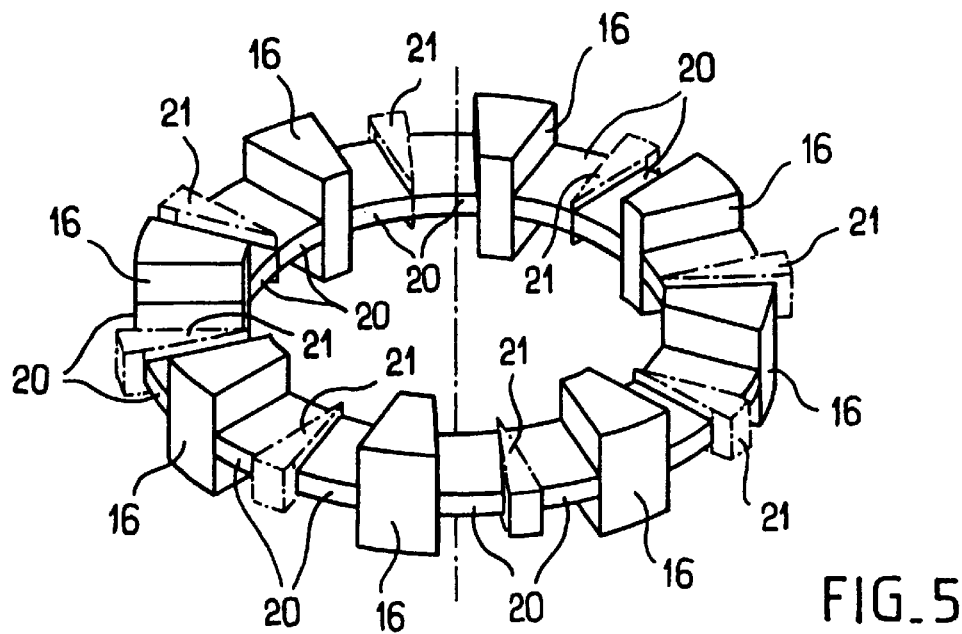
FIG_5
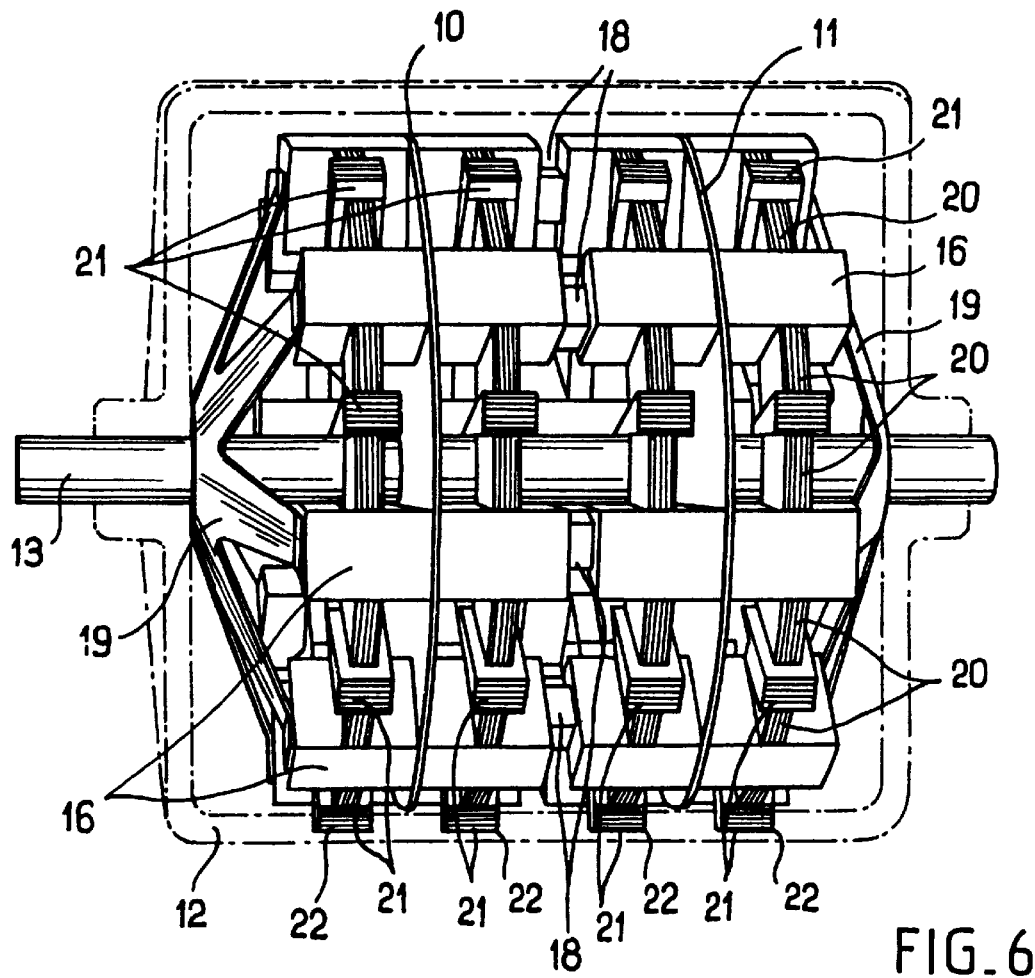
FIG_6

VIBRATION MOTORS

BACKGROUND OF THE INVENTION

1. Field of the Invention

The present invention concerns vibration motors.

Vibration motors are also known as ultrasound motors, referring to their preferred frequency of operation, or piezo-active motors, referring to their preferred excitation material.

2. Description of the Prior Art

FIGS. 1 and 2 schematically illustrate the operating principle of one example of a vibration motor.

The motor shown in the above figures has a rotor disk 1 mounted on a frame 2 to rotate about a shaft 3.

It also includes a stator 4 that drives rotation of the rotor 1 by a combination of cyclic tangential deformation of its surface in contact with the rotor and a synchronous perpendicular force.

In the example shown in FIGS. 1 and 2 the stator include two plates 4a, 4b disposed one on each side of the rotor disk 1. Each of the two plates 4a, 4b comprises a plurality of regularly distributed contact sectors 5 with active members 6 between them which cause said contact sectors 5 to move away from each other or towards each other cyclically. The active members 6 are piezo-electric, magnetostrictive or electrostrictive members, for example.

The contact sectors 5 of the two plates 4a, 4b are exactly superposed. The facing contact sectors 5 of the two plates 4a, 4b are connected by active members 7 disposed between said plates. The active members 7 are deformed cyclically so that said contact sectors 5 successively grip and then release the disk of the rotor 1.

The combination of the tangential deformation created by the active member 6 and the normal force created by the active members 7 generates by friction a non-null average force driving continuous rotation of the rotor.

Vibration motors have many advantages.

In particular, they have a high torque at low rotation speeds. As a result no or little reduction gearing is required in many applications, unlike conventional electric motors.

Also, vibration motors often have a much higher power per unit mass than conventional gear motors (approximately 3 times greater).

However, the mechanical power ratings of vibration motors are limited to a few tens of watts.

One aim of the invention is to propose a vibration motor structure capable of producing much more power than existing vibration motors whilst retaining the advantages of the light weight of vibration motors, even at high power, and without significantly increasing their overall size.

SUMMARY OF THE INVENTION

To this end, the invention proposes a vibration motor including in a casing at least two pairs of stator plates which comprise tangential deformation active members, two rotor disks between the plates of respective pairs, active members for generating a normal force between facing plates of both pairs and spring means between the pairs of plates and the casing.

With the above motor configuration the contact areas of the stator plates on the rotor disks are maximal and the mechanical coupling is optimal.

A structure of the above kind also has the advantage of minimizing wear.

Other features and advantages of the invention will emerge from the following illustrative and non-limiting description which should be read in conjunction with the accompanying drawings.

BRIEF DESCRIPTION OF THE DRAWINGS

FIG. 1 is a diagrammatic partial top view of a vibration motor illustrating its principle of operation.

FIG. 2 is a diagrammatic partial view in axial section of the motor from FIG. 1.

FIG. 3 is a diagrammatic view in axial section of one embodiment of a vibration motor of the invention.

FIG. 4 illustrates the kinematics of the various components of the motor from FIG. 3.

FIG. 5 is a perspective view of a preferred embodiment of a stator plate of the invention.

FIG. 6 is an exploded perspective view of one embodiment of a motor of the invention.

DETAILED DESCRIPTION OF THE PREFERRED EMBODIMENTS

The vibration motor shown in FIGS. 3 and 4 includes two rotor disks 10, 11 and two pairs 14, 15 of stator plates respectively cooperating with said disks 10, 11.

The two rotor disks 10, 11 are flexible disks attached to a common shaft 13 by means of which they are mounted to rotate relative to a casing 12.

The rotor 10 extends between the two stator plates 14a, 14b of the pair 14; the rotor 11 extends between the two stator plates 15a, 15b of the pair 15.

The two plates 14a, 15a of the two pairs 14, 15 face each other and are referred to hereinafter as the inner plates, the two plates 14b, 15b being referred to as the outer plates.

Each stator plate 14a, 14b, 15a and 15b is made up of a plurality of contact sectors 16 in an annular arrangement which are separated in pairs by tangential deformation active members 17.

The contact sectors 16 are made of metal. They advantageously have at least one area made of a shape memory alloy near their contact surface (as described in our French patent application N° 95/14169).

The contact sectors 16 of the two inner plates 14a, 15a are aligned with each other. Active members 18 for generating a normal force are disposed between the sectors 16 of the two inner plates 14a, 15a.

Spring means 19 are disposed between the casing 12 and the contact sectors 16 of the outer plates 14b, 15b.

When an active member 18 increases in length the contact sectors 16 with which it is aligned grip the rotor disks 10, 11. When it decreases in length the corresponding contact sectors 16 release the disks 10, 11.

The spring means 19 are of low stiffness but have sufficient elongation to hold the contact sectors 16 pressed against the rotor disks when they are compressed by the increase in the length of the active members 18.

The active members 17 and/or 18 advantageously have multilayer structures integrating in parallel or in series piezo-electric, magnetostrictive or electrostrictive ceramic layers and metallic layers. A multilayer structure of the above kind has the advantage of enabling the use of low voltages.

Two active members 17 on respective opposite sides of the same sector 16 are excited in antiphase. Similarly, two adjoining active members 18 are excited in antiphase.

The active members 18 for generating a normal force are commanded with the same excitation frequency as the tangential deformation active members 17, for example.

The disks 10 and 11 and the pairs of stator plates 14, 15 consequently oscillate by deforming in the manner shown in FIG. 4.

The spring means 19 press the stator plates 14*a*, 15*a*, 14*b*, 15*b* onto the rotor disks 10 and 11 and take up play and dimensional variations.

With a configuration such as that just described, the clamping effect is created by the inertia of the two pairs of stator plates 14, 15.

This configuration also has the advantage of being tolerant to wear of the rotor and of the stator and to some manufacturing defects.

A preferred stator plate configuration is shown in FIGS. 5 and 6.

In that configuration the tangential deformation active members 17 between two successive contact sectors 16 each comprise two parallelepiped-shape ceramics 20 with a metallic material triangular wedge 21 disposed between them.

Note that the parallelepiped-shape of the ceramics 20 minimizes their cost.

The dimensions of the wedge 21 are optimized so that the vibrational movement of the contact sectors 16 is substantially circular with the center of the circle on the axis of the rotor.

As shown in FIG. 6, the wedges 21 are also used to attach the stator plates to the casing 12 of the motor. They constitute points of no movement which, if they are used as attachment points, prevent the transmission of vibration from the motor to the casing.

Portions of the wedges 21 project from the outside contours of the stator plates 14*a*, 14*b* and 15*a*, 15*b*. The projecting portions of the wedges 21 cooperate with recesses 22 of complementary shape on the inside face of the casing 12 and into which said portions are received.

In the example shown in FIG. 6, the spring means 19 are spring washers with central parts bearing against the back of the casing 12 and fingers having their ends bearing on the sectors 16 of the outer stator plates 14*b*, 15*b*.

There follows one example of stator plate dimensions.

The inside radius is 50 mm. The outside radius defined by the sectors 16 and the parallelepiped shape ceramics 20 is 75 mm.

There are eight sectors 16.

The ceramics 18 and 20 are made of PZT.

The ceramics 20 have a thickness at rest of 5.8 mm, a radial width of 25 mm and a circumferential width of 15.6 mm.

The sectors 16 have a thickness of 28 mm.

The outside radius of the wedges 21 is 76 mm and their thickness is 6 mm.

The range of tangential movement of the members 17 is 13 μm.

The members 18 have a thickness (in the height direction of the motor) of 6.6 mm for a sector of 10*10 mm². The range of movement of the members 18 is 4.6 μm.

The operating frequency of a motor of the above kind is 20 kHz for a no load rotation speed of 17 rd/s and a rotation speed under load of 9.3 rd/s.

The tangential pressure exerted by the ceramics 20 on the sectors 16 is 1.5 MPa; the normal pressure exerted by the members 18 is 7.6 MPa.

Note that a configuration of the above kind does not require thick rotor disks 10, 11. The disks 10 and 11 are made of steel and are 1 mm thick, for example.

The output power of the above motor is 4 kW and its total mass is 5 kg.

The structure proposed by the invention finds many applications. In particular, it is advantageously used to move an aerodynamic control surface of an aircraft.

Embodiments other than the one that has just been described can of course be envisaged. In particular, given that the normal resonance forces are not operative, it is not necessary for the coupling of the normal mode to be very high. The members 18 that constitute the normal resonant structure can therefore be configured and dimensioned in accordance with many considerations: minimizing losses, tuning normal and tangential resonant frequencies, temperature resistance, etc.

The following description is concerned with the prestressing of the piezo-electric material.

The minimal value of the prestress σp of the piezo-electric material for there to be on tensile stress is:

$$E \frac{2x_n}{l}$$

l=length of material
E=Young's modulus
$x_n$=amplitude of normal oscillation of each of the metal petals 6.

The following must also apply:

$$\sigma p + E \frac{2x_n}{l} \leq \sigma_{max}$$

where $\sigma_{max}$=maximal compression stress.

The normal resonant frequency F of an active member 18 defines the stiffness K of said active member 18 such that:

$$K = (2\pi F)^2 \frac{M}{2}$$

where M is the mass of each side of a piezo-electric member 18, including that of the metal petals 16 and the portions of the disks 10 and 11 that are aligned with the member 18.

Moreover, the maximal value ΔU of the oscillating part of the rotor/stator bearing force is:

$$\Delta U = \frac{M}{2} (2\pi F)^2 x_n$$

For the rotor and the stator to remain in mutual bearing engagement at all times, the prestressing springs must produce a static force $U_0$ greater than or equal to ΔU. It is not beneficial for this force to be much greater than AU because it would then reduce the efficiency of the motor. It is therefore desirable for $U_0$ to be practically equal to ΔU.

For the force $U_0$ also to prestress the ceramic, in order to simplify the mechanical construction, the following condition must apply:

$$\frac{U_0}{S} = \sigma p$$

which finally yields:

$$\sigma p = E\frac{x_n}{l}$$

Thus it is not possible to satisfy the first condition:

$$\sigma p = E\frac{2x_n}{l}$$

A first solution to the above problem would be to make the member of stiffness K from two materials in parallel, one piezo-electric and the other metallic. Because of its tensile strength, the metal can assure the missing prestressing. Although this solution is feasible, it is subject to manufacturing disadvantages, for two main reasons:

- to assure the prestressing the metal must be solidly anchored in the masses or form a small box encapsulating the piezo-electric material; this small box must be closed for prestressing and severely limits wiring access to the piezo-electric material;
- it is not easy to maintain the prestressing constant as a function of temperature without designing the metallic part to be much more flexible than the piezo-electric part by surrounding it or imparting a corrugated shape to it.

The solution proposed by the invention exploits the flexibility of the rotor-stator interface.

Patent application 95 14169 explains the benefit of this flexibility for improving the efficiency of conversion of vibration into continuous movement using fields of metallic pins. There is some latitude as to the choice of the normal stiffness k of this interface structure.

In accordance with one aspect of the present invention it is proposed that this interface stiffness should be chosen to solve the problem of prestressing the piezo-electric material.

Note firstly that the mechanical oscillator described with reference to FIGS. 3 through 6 can be actuated in two different normal vibration modes.

In the first mode the metallic petals 16 on respective opposite sides of the disk 10 (respectively 11) are excited in phase with each other and in antiphase with the petals on respective opposite sides of the other disk of the rotor, i.e. the disk 11 (respectively 10).

This mode of excitation corresponds to that described in application FR 97 10948 and to a resonant frequency of $$F_1 = \frac{1}{2\pi}\sqrt{\frac{2K}{M} + \frac{2k}{M} - \sqrt{\frac{4K^2}{M^2} + \frac{4k^2}{M^2}}}$$

However, a second mode of excitation is feasible in which the masses of respective opposite sides of the same disk $1a$, $1b$ of the rotor are excited in antiphase and the masses on respective opposite sides of an active member are also in antiphase.

The frequency of this second mode is:

$$F_2 = \frac{1}{2\pi}\sqrt{\frac{2K}{M} + \frac{2k}{M} - \sqrt{\frac{4K^2}{M^2} + \frac{4k^2}{M^2}}}$$

The above two frequencies lie one on each side of the previously defined frequency:

$$F = \frac{1}{2\pi}\sqrt{\frac{2K}{M}} = F$$

which can be obtained from the formula for F1 by making k tend to infinity.

For a given resonant frequency $F_0$ the complementary terms under the square root sign mean that, using the second inherent mode of vibration, a value of K can be chosen that is smaller for the same value of $F_0$. It is then possible to choose a smaller S or a larger l in the expression $$K = \frac{ES}{l},$$

and to satisfy the requirements of prestressing the piezo-electric material.

There is claimed:

1. A vibration motor including in a casing at least two pairs of stator plates which comprise tangential deformation active members, two rotor disks, one rotor disk between the plates of one of the at least two pairs of stator plates and the other rotor disk between the plates of the other of the at least two pairs of stator plates, active members for generating a normal force between facing plates of the at least two pairs of stator plates, and spring means between said at least two pairs of stator plates and said casing.

2. The vibration motor claimed in claim 1 wherein a stator plate is a ring that comprises a plurality of metallic contact sectors in an annular arrangement and separated in pairs by tangential deformation active members.

3. The vibration motor claimed in claim 2 wherein said active members for generating a normal force extend between said contact sectors of said facing plates of both pairs.

4. A vibration motor claimed in claim 3 wherein said tangential deformation active members and/or said active members for generating a normal force comprise one or more piezo-electric, magnetostrictive or electrostrictive ceramic layers in parallel or in series with one or more metallic layers and a tangential deformation active member disposed between two contact sectors includes two parallelepiped shape ceramic members with a metal wedge between them.

5. The vibration motor claimed in claim 4 wherein said metallic wedges cooperate with said casing to fix said stator plates to said casing.

6. The vibration motor claimed in claim 5 wherein said metal wedges have portions projecting from the main outside annular contour of said stator plates and cooperating with recesses of complementary shape on the inner face of said casing and in which said portions are received.

7. The vibration motor claimed in claim 1 wherein said tangential deformation active members and/or said active members for generating a normal force comprise one or more piezo-electric, magnetostrictive or electrostrictive ceramic layers in parallel or in series with one or more metallic layers.

8. The motor claimed in claim 1 wherein said spring means are spring washers disposed between the back of said casing and said stator plates.

9. The motor claimed in claim 1 wherein said active members for generating a normal force are excited so that masses on respective opposite sides of the same rotor disk are in antiphase and masses on respective opposite sides of said active members are also in antiphase, said active members being dimensioned so as to comply with prestressing conditions.

* * * * *